United States Patent
Yi et al.

(10) Patent No.: US 8,160,547 B2
(45) Date of Patent: Apr. 17, 2012

(54) VEHICLE TELEMATICS UNIT ACTIVATION WITH PROVISIONING DETECTION

(75) Inventors: Ki Hak Yi, Windsor (CA); Sethu K. Madhavan, Canton, MI (US)

(73) Assignee: General Motors LLC, Detroit, MI (US)

( * ) Notice: Subject to any disclaimer, the term of this patent is extended or adjusted under 35 U.S.C. 154(b) by 420 days.

(21) Appl. No.: 12/541,681

(22) Filed: Aug. 14, 2009

(65) Prior Publication Data
US 2011/0039533 A1 Feb. 17, 2011

(51) Int. Cl.
*H04M 1/16* (2006.01)
(52) U.S. Cl. ........... 455/410; 455/419; 455/456.1; 701/23; 701/24; 701/29; 701/36; 701/222
(58) Field of Classification Search ............ 701/23, 701/24, 29, 36; 455/410–411, 419, 404.1, 455/435.2
See application file for complete search history.

(56) References Cited

U.S. PATENT DOCUMENTS
2003/0103482 A1* 6/2003 Van Bosch .................. 370/338
* cited by examiner

*Primary Examiner* — Dwayne Bost
*Assistant Examiner* — Inder Mehra
(74) *Attorney, Agent, or Firm* — Anthony L. Simon; Reising Ethington P.C.

(57) ABSTRACT

A system and method for making vehicle originated calls to a telematics service provider or other call center. The method includes identifying a call type associated with a desired wireless communication of speech or data to the call center, and then carrying out one of a number of different call connection processes depending on the call type. For voice channel cellular connections, an in-band modem cellular connection is preferably established in most instances using a connection retry strategy that includes primary, secondary, and possibly tertiary connection attempts. Cell selection can be carried out using an acquisition task, background scan and inter-country PLMN reselection process that are used to select among available PLMNs and base stations. The system and method can be carried out in connection with various cellular system technologies, but is especially suited for use with GSM systems.

15 Claims, 13 Drawing Sheets

Call Connection Table

| Message Category | Initiating Input | Message Type | Preferrred Call Type | Alt. Call Type | Retry Track |
|---|---|---|---|---|---|
| Collision Detection | Sensor | As specified for the trigger | VCC | None | Extended |
| Emergency | Emergency Button Press or Voice Command | 3637 | VCC and SMS | None | Extended |
| Hybrid Battery Disconnect | Sensor | 423 | VCC | None | Extended |
| Advisor | Manual Button Press or Voice Command | 72 – Roadside Assistance | VCC | None | Limited |
| Advisor VFB Only | Manual Button Press or Voice Command | 72 – Roadside Assistance | VCC | None | VFB Only |
| Enrollment | Manual Button Press or Voice Command | 36 | VCC | None | Limited |
| Vehicle Theft | Sensor | 88 | Packet | VCC | Non-VFB |
| Vehicle Data Upload | Telematics Trigger | 838 | IMCC or SMS | VCC, IMCC, or SMS | Limited |
| User Route Download | Telematics Trigger | None | Packet | IMCC | Non-VFB |

*Figure 3*

VEHICLE TELEMATICS UNIT ACTIVATION WITH PROVISIONING DETECTION

TECHNICAL FIELD

The present invention relates generally to techniques for establishing mobile vehicle originated cellular communications from a vehicle telematics unit to a remote call center.

BACKGROUND OF THE INVENTION

Vehicle telematics services carried over a public land mobile network (PLMN) or other wireless carrier system present certain challenges unique to the mobile vehicle application. For example, some vehicle telematics units (VTU) are designed to permit both voice and data communications over the wireless carrier system using one or more of the various available different transmission technologies, such as 2G CDMA (IS-95), 3G CDMA2000 (IS-2000, 1 XRTT, EVDO), 3G UTMS (W-CDMA, HSPA), 2G/2.5G GSM (GPRS and EDGE). Depending on such things as the technology used, e.g., GSM versus CDMA, the registration or acquisition process required, the frequent movement of the vehicle into and out of a home PLMN (HPLMN), the availability of one data transmission protocol versus another, and the particular type of call being made to or from the vehicle, the VTU may only have one wireless communication protocol available and suitable for use, or may have more than one from which it can select. And while multiple types of wireless transmission may be available at any one time, their associated cost of use can vary making it desirable to judiciously select among them. Similarly, call connection costs associated with data roaming can be significant and it can therefore be desirable to implement connection strategies that minimize roaming and its associated costs.

This can be especially true for vehicle telematics units since, when used, a telematics unit may often be moving (with the vehicle) at a speed that exposes it to an ever-changing cellular landscape, which can include rapidly moving between different cellular networks (wireless carrier systems), including into and out of roaming and home cellular networks.

SUMMARY OF THE INVENTION

According to one aspect of the invention, there is provided a vehicle telematics unit activation method for use with a wireless cellular network. The method comprises the steps of: (a) receiving a connection request via an initiating input at a telematics unit in a vehicle; (b) attempting a location update with the wireless cellular network; (c) receiving a location update rejection and an identifier indicating a reason for the rejection; (d) re-attempting the location update if the identifier has a first value; and (e) waiting for a subsequent initiating input before re-attempting the location update if the identifier has a second value.

According to another aspect of the invention, there is provided a vehicle telematics unit activation method for use with a GSM wireless cellular network. The method comprises the steps of (a) receiving an initiating input and determining that the telematics unit has not been activated on the GSM network; (b) attempting a location update with the GSM network; (c) receiving a location update rejection and cause code; (d) re-attempting the location update only after receiving another initiating input if the cause code indicates that an IMSI for the telematics unit is not contained in a home location register for the GSM network; and otherwise (e) re-attempting the location update one or more times for other causes of the rejection.

BRIEF DESCRIPTION OF THE DRAWINGS

One or more preferred exemplary embodiments of the invention will hereinafter be described in conjunction with the appended drawings, wherein like designations denote like elements, and wherein:

FIG. 3 is a call connection table identifying different call types and containing call parameters used by the method of FIG. 2 to determine what type of call to establish with the call center;

DETAILED DESCRIPTION OF THE PREFERRED EMBODIMENT(S)

The system and methods described below can be used by a vehicle telematics unit (VTU) as a part of establishing a vehicle originated voice and/or data connection with a call center or other entity in response to some initiating input received by the telematics unit. The methods described below include processes that can be used by the VTU to monitor for and obtain wireless connections to preferred cellular networks as the vehicle moves through different geographic locations. Although the methods described below are such as they might be implemented for a 2G GSM (GPRS and EDGE) system, it will be appreciated that they could be useful in 3G UTMS (W-CDMA, HSPA) and other types of cellular systems.

Communications System

Figure 1:
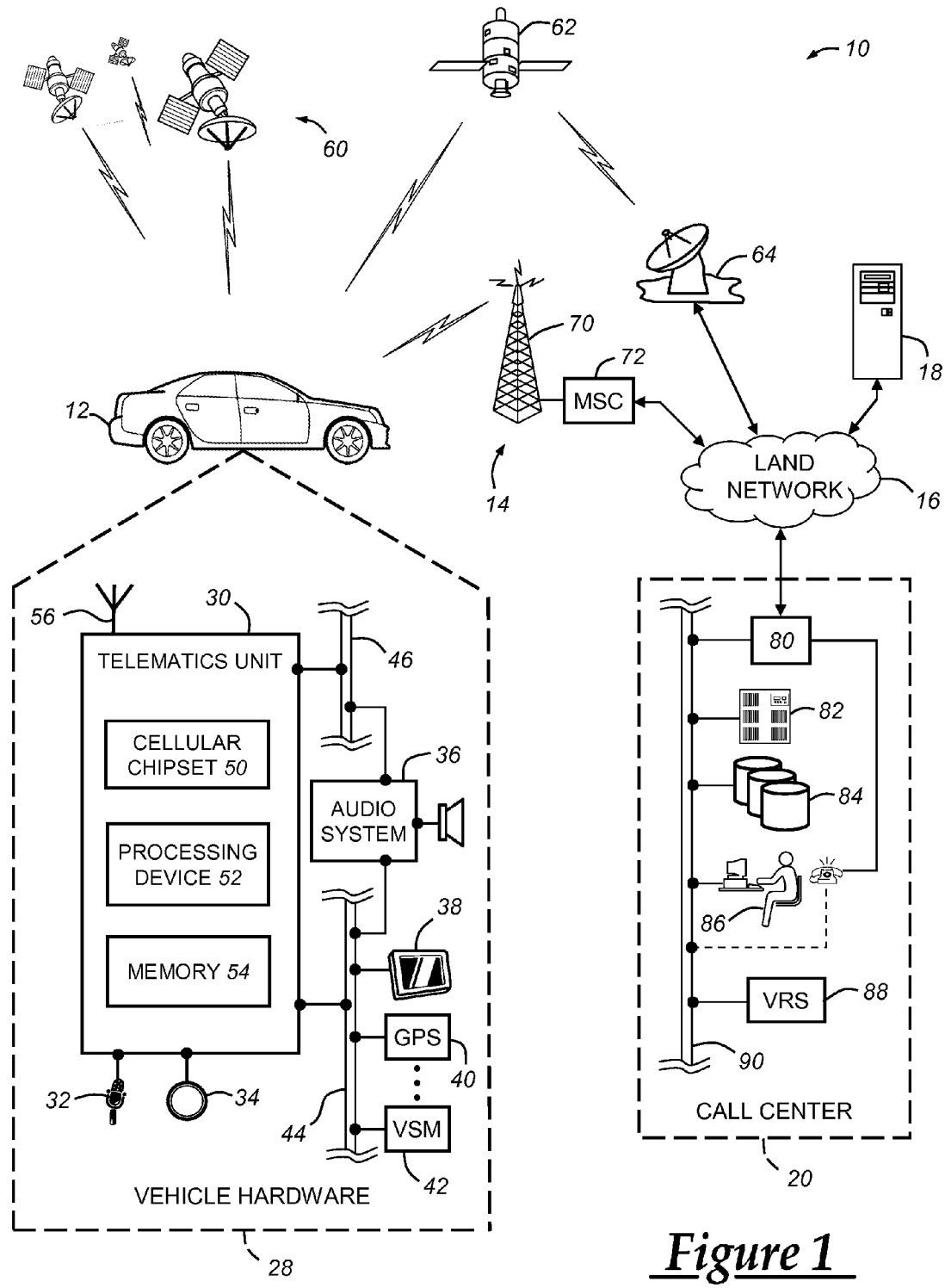
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the methods disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle telematics unit (VTU) 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via short message service (SMS) or packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to GSM, W-CDMA, or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols used in the wireless industry such as 3 gpp or 3 gpp2. Wireless networking between the vehicle and other networked devices can also be carried out using telematics unit 30. For this purpose, telematics unit 30 can be configured to communicate wirelessly according to one or more protocols implemented per 3 gpp or 3 gpp2 standards and also other wireless protocols, such as any of the IEEE 802.11 protocols, WiMAX, or Bluetooth. When used for packet-switched data communication such as TCP/IP, the telematics unit can be configured with a static IP address or can be set up to automatically receive a dynamically assigned IP address from another device on the network, such as from a router or from a network address server (e.g., a DHCP server).

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as 2G CDMA (IS-95), 3G CDMA2000 (IS-2000, 1XRTT, EVDO), 2G/2.5G GSM (GPRS, EDGE), or 3G W-CDMA (UMTS, HSPA). As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

The cellular system 14 is also referred to herein as a cellular network. Apart from using wireless network 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, a packet-switched data network (PSDN), and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. For example, computer 18 can be connected to one or more of the other system 10 components via a private or virtual private network (VPN) implemented through a leased line or Internet ISP in the PSDN. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless local network using protocols such as 802.11x and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method

Figure 2:
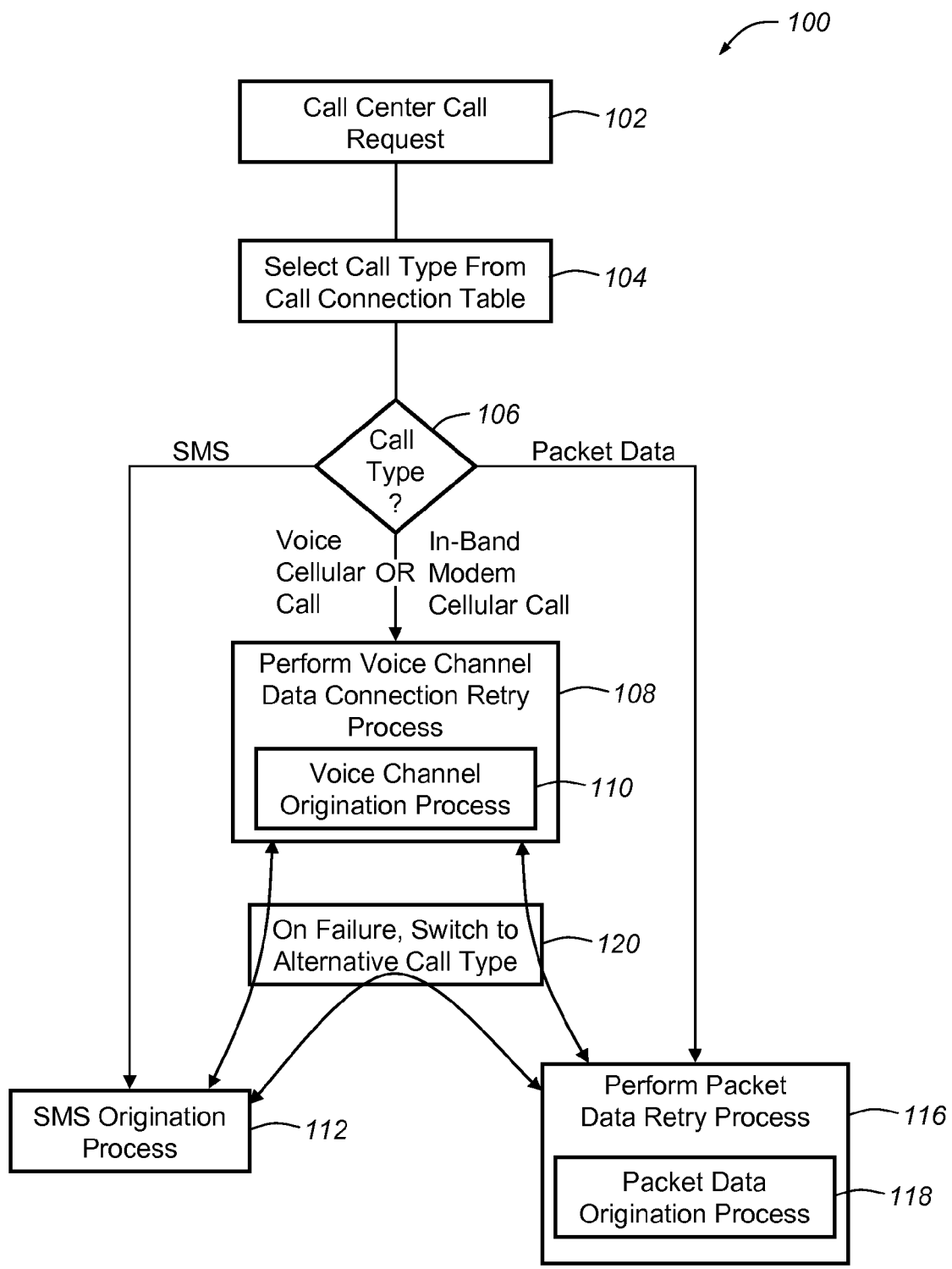
FIG. 2 is a flowchart depicting an overview of one embodiment of a communications method that can be used by a vehicle telematics unit such as in FIG. 1 to establish a voice or data connection with a call center in response to an input requesting the connection.

Turning now to FIG. 2, there is shown the overall connection strategy 100 for making vehicle originated calls from the telematics unit 30 to the call center 20. The method of FIG. 2 as well as that of the other figures can be carried out using suitable programming of the vehicle telematics unit (VTU) as well as using suitable hardware and programming of the other components shown in FIG. 1. These features of any particular implementation will be known to those skilled in the art based on the above system description and the discussion of the various methods that are described below in conjunction with the remaining figures. Further, as noted above, although any of a variety of different wireless communication technologies can be used, the following discussion is directed most specifically to the use of 2G/2.5G GSM (GPRS and EDGE) and also indirectly as part of the network parameters, air interface and channel scheme for 3G W-CDMA (UMTS and HSPA).

The method of FIG. 2 begins with the step 102 of obtaining a request to connect to the call center 20. This request is in some form of an input received or otherwise obtained by the telematics unit 30, and the input is associated with a desired wireless communication of data or other message via either a voice communication (speech) or data connection from the vehicle 12 to a call center 20. This initiating input can be received from the vehicle LAN (e.g., via bus 44) or from the vehicle user interface, or from some other source. For example, the input can be a manual input by the vehicle driver or other occupant, such as a button press or voice command to indicate that a call to the call center is desired. Or, the input can be generated automatically, such as by a sensor or controller in response to sensor input. An airbag deployment signal, such as is generated by a crash sensor, is one known example of sensor input that automatically initiates a data connection to the call center. Another type of input is a trigger that can be set on the vehicle, such as a software trigger in the telematics unit 30 or elsewhere that, when the trigger occurs, initiates the connection to the call center. Yet another input is as a response to a received wireless communication from the call center or elsewhere, whether via cellular telephony, satellite broadcast, or otherwise. In this latter scenario, the telematics unit 30 can initiate the call center call to respond to the earlier received communication, such as to acknowledge receipt or performance of some action on the vehicle, or to supply information such as DTCs or other vehicle data.

Depending on the reason for the call center call, one of a number of different types of potential connections will be used for communication of the data or other message back to the call center 20. Thus, the next step 104 is to select a call type associated with the desired wireless communication back. This selected call type identifies the type of connection being attempted between the VTU and call center; for example, a voice cellular call (i.e., speech conducted over a cellular voice channel), an in-band modem cellular call (i.e., a modem data connection established over a cellular voice channel), or a non-voice channel (NVC) data connection such as SMS or a packet data connection (e.g., TCP/IP using GPRS or EDGE). Thus, as one example, for communication of speech, a voice cellular call can be used, whereas for the communication of data, either an in-band modem cellular call or a NVC data connection can be used. Other call types can be used as well. For example, speech can be communicated using a data connection wherein the speech is digitized and sent over, for example, a packet data connection.

Selection of the call type can be carried out based on one or more call parameters, such as the content of the desired wireless communication (e.g., an emergency call versus a request for navigation assistance versus an automatic upload of DTCs or other vehicle data), the source of the requesting input for the communication (e.g., manual button press by an occupant versus an automatic input based on a sensor reading versus a call received from the call center), or the intended recipient (e.g., server 82 versus advisor 86 versus VRS 88). In at least some instances, the selected call type can be a preferred call type with an alternative call type being specified as a backup. If at some point during the process of FIG. 2, the VTU 30 determines that one or more origination attempts using the preferred call type has failed, then the alternative call type can be used to access and carry out an alternative connection strategy. This is shown at block 120. In addition to or in lieu of the use of an alternative connection strategy, a separate retry track can be specified to identify a desired level of persistence in attempting origination. This is discussed in more detail below.

FIG. 3 depicts a call connection table that contains the various call parameters which relate to different types of communications and which are useful in selecting a desired call type. Each row of the table represents a different type of message, or communication, to be sent to the call center 20. Selection of the call type to be used for communication of the message can be selected based on a message category or, as noted above, can be based on one or more other factors such as the type or source of initiating input. The message category shown is a broad classification of the content of the communication itself. If desired, one or more other levels of abstraction of the message content can be identified and used either for selection of call type or for reporting back to the call center or taking other action. For example, in the illustrated call connection table, there is also provided a message type, which is a finer classification of the message content into a calling code associated with the message contents. This calling code can be sent to the call center at the establishment of the connection and used for various purposes, such as to identify what vehicle data is being uploaded to the call center or how the call or uploaded data should be processed within the call center. The various call parameters shown in FIG. 3 are representative of the different messages and initiating inputs involved in initiating calls to the call center; however, it will be appreciated that many other additional types could also be used.

As indicated in FIG. 3, for each type of desired wireless communication, there is a preferred call type which, in the illustrated embodiment, is either a voice cellular call (VCC), an in-band modem cellular call (IMCC), a packet data connection, or an SMS (either binary or text-based messaging). Also, in some instances, an alternative call type is identified, such as in the case of certain preferred packet data call types where an IMCC connection attempt can be used as an alternative connection strategy if the packet data connection fails. The retry track identifies a persistence level that is useful in attempting originations of voice channel cellular connections so that, for higher priority communications, the VTU will carry out an additional, comprehensive connection strategy in the event that other origination attempts fail.

Referring back to FIG. 2, once the call type is selected at step 104, then the process branches based on the selected call type, step 106, and carries out an appropriate connection strategy associated with the selected call type. For a voice cellular call, which is meant to be used by an occupant for communicating with the call center advisor or voice response system (VRS) via speech, a voice-only cellular call can be established wherein only speech is exchanged with the call center via the cellular system's voice channel. However, in the embodiment of FIG. 2, where the call type is either the voice channel call or the in-band modem cellular call, the method moves to block 108 where a voice channel cellular call is established using a voice channel data connection retry strategy. This approach is done even for voice cellular calls so that useful vehicle data can be uploaded to the call center for use by the advisor or VRS prior to the start of speech. The connection retry strategy used to establish the voice channel cellular call involves a plurality of different connection methods that are attempted serially until either one of the methods results in a successful origination, or all fail. In general, the methods each involve attempting to attach to a cellular base station, originating a voice channel cellular connection via the attached base station, and then establishing a modem data connection with the call center over the originated connection. As used herein, an "attached base station" is, for GSM systems, a base station for which the VTU is camped on, is receiving a decodable broadcast control channel (BCCH), and is registered. For CDMA, an "attached base station" is one on which VTU is registered. Thus, using an attached base station, the step 108 will carry out a voice channel origination process 110 during which the telematics unit attempts origination of the voice channel cellular connection and, if the connection is made, it will then establish the modem data connection to upload the desired data. The voice channel data connection retry process and its different connection methods are discussed in greater detail below in connection with FIGS. 4-7 and the voice channel origination process can be carried out according to FIG. 8 or otherwise in a manner known to those skilled in the art.

For a NVC data connection call type, the process of FIG. 2 uses a connection strategy that attempts to establish either a packet data connection or an SMS data connection, and the selection between these two types of data connections can be made in any desired manner, such as by using the call connection table of FIG. 3. Where an SMS data connection is desired, the process moves from step 106 to 112 where it carries out an SMS origination process 112 to establish an SMS data connection. If successful, then the desired wireless communication can be transmitted to the call center in the form of a text message. And, where a packet data connection is desired, the process instead moves from step 106 to 116 where it carries out a packet data retry process that attempts a packet data origination 118 to establish the packet data connection. If successful, then the desired wireless communication is transmitted as packetized digital data from the vehicle to the call center. The SMS origination process 112 and the packet data retry process 1 16 and its origination process 118 can be carried out in a manner known to those skilled in the art.

Where communication with the call center via the preferred call type is not available, the process can permit an attempted connection via one of the other call types as an alternative connection strategy, as indicated at block 120. The determination as to whether one or more alternative strategies should be used can be carried out in various ways, such as by using the call connection table of FIG. 3 to specify for each message type or each call type what alternative, if any, is available.

Once a suitable connection is established between the VTU 30 and call center 20, the desired wireless communication of speech and/or data is sent via that connection. The process of FIG. 2 then ends.

Figure 4:
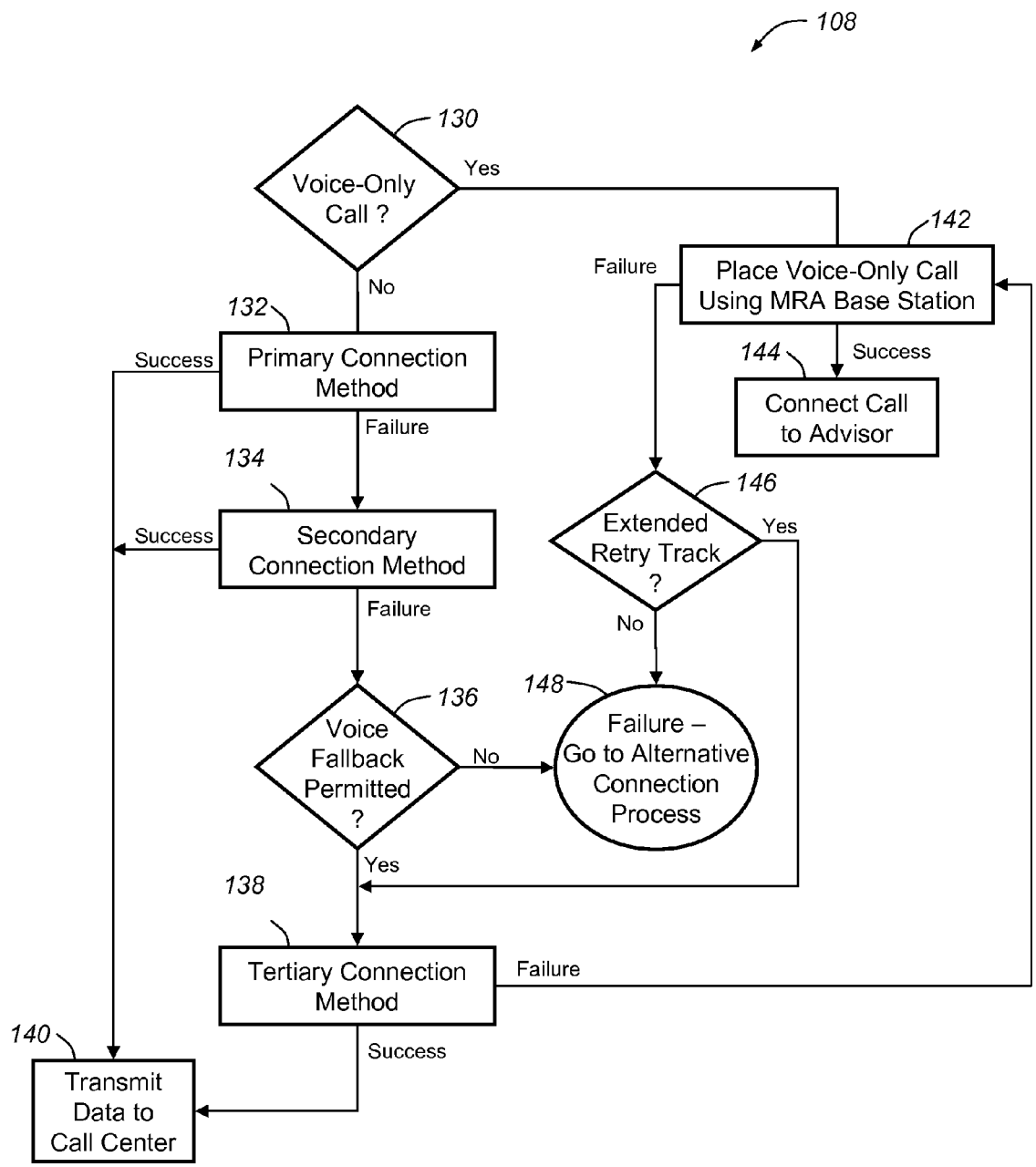
FIG. 4 is a flowchart showing one embodiment of a voice channel retry method for use by a vehicle telematics unit in establishing a voice channel cellular connection with a call center.

FIG. 4 depicts the voice channel data connection retry process 108 in greater detail. In the illustrated embodiment, this process is used for originating both voice-only calls (speech only) as well as in-band modem cellular calls (IMCCs), although it will be appreciated that, if desired, the process could be used to establish other types of vehicle originated calls, such as packet data connections and SMS transmissions. The first step is to determine at block 130 which of these two call types is being attempted. In most instances, it is desirable even for calls meant primarily to conduct speech between a vehicle occupant and call center that an IMCC be established during the first few seconds of the call to upload vehicle data, as noted above. For these calls, the process moves to step 132 to carry out a primary connection attempt in which origination of the IMCC is attempted using either a currently-attached base station or one that can be attached to via an idle mode process that involves cell reselection and attempting to attach to a base station following cell reselection. The primary connection method 132 is further described farther below in connection with FIG. 5.

The idle mode process can be implemented using standard GSM procedures. In one implementation, the idle mode process can be carried out using the C2 reselection algorithm, as is known to those skilled in the art. Apart from only cell reselection, the GSM idle mode process can perform a more complete search for an available base station. For example, the idle mode process used can perform the following procedures: (1) PLMN section and reselection; (2) Cell selection (C1) and reselection (C2); and (3) location registration. These procedures are known to those skilled in the art. For example, PLMN selection can be carried out per TS23.122 , cell selection/reselection can be carried out per TS43.022/TS45.008, and location registration for IMSI Attach/Detach can be carried out per TS23.122/TS23.012. As will be known by those skilled in the art, in implementing the idle mode process, the search for a PLMN can be limited to the access technology or access technologies associated with the PLMN in the appropriate PLMN Selector with Access Technology List (User Controlled or Operator Controlled selector list), as long as the specified Access Technology is also specified in the HPLMN Selector.

If the vehicle telematics unit is successfully attached to a base station per the primary connection method 132, then it carries out the voice channel origination process 110 of FIG. 2 which establishes the desired modem data connection with the call center, and the process then moves to step 140 where it transmits vehicle data to the call center over the established connection. The process then ends. If the primary connection attempt fails, then the retry strategy involves a secondary connection attempt 134 referred to herein as the MRA (most recently attached) connection process. In general, the MRA connection process 134 involves selecting a PLMN or other wireless carrier system recently used in placing a previous call, carrying out a cell selection process using the selected carrier system, attaching to a selected base station, and originating the IMCC to the call center via the attached base station. If this does not work, then the method further comprises repeating the carrier system selection, cell selection, and attaching steps using other previously used carrier systems until either a successful origination is made or until origination via a base station has been unsuccessfully attempted on all selected wireless carrier systems. This can be done using a list of the previously used PLMNs or other carrier systems that is maintained at the vehicle and that is updated each time a new call is originated. The secondary connection method 134 is further described farther below in connection with FIG. 6.

As with the primary connection method, if this secondary connection attempt is successful, then the voice channel cellular connection is originated and the modem data connection set up as indicated at step 110 of FIG. 2. If the secondary connection attempt fails, the process moves to step 136 where a check is made to determine whether the call being placed is permitted to revert to a voice-only call if the modem data connection cannot be established (voice fallback)—for example, because of an outage of an in-band data modem bank in the call center or a malfunction of the in-band modem in the VTU 30. In general, most voice calls are permitted to switch to voice fallback since the desired communication is speech, whereas non-voice calls are not. This can be specified in the call connection table of FIG. 3. Examples of speech-based calls for which voice fallback is desired include emergency and collision detection calls, roadside assistance calls, and telematics services enrollment calls from the vehicle. In each case, live speech with the occupant is desired and so the establishment of a voice-only call still enables the desired communication to be carried out. Examples for which no voice fallback is desired can include automated data upload, downloading of navigation routes to the vehicle, and notification to the call center of a vehicle theft using an on-board theft detection system. As will be appreciated, some or all of these latter types of data communication calls may not even involve interaction with an occupant so there may be no benefit in providing a voice-only connection in the event that a data connection cannot be established.

If voice fallback is not permitted for the call being placed, then the process 108 is considered to have failed, as indicated at block 148. In this case, if the call connection table specifies an alternative call type for the call being placed, then the alternative connection strategy can be carried out, as indicated by block 120 of FIG. 2. If voice fallback is permitted, then the process moves to block 138 where a tertiary connection attempt is made. In general, this tertiary attempt implements a comprehensive connection strategy that includes attempting reselection of one or more PLMNs using a manual network selection mode supported by the GSM cellular system. If a reselected PLMN is successfully obtained, then the telematics unit attempts to attach to a base station within the reselected PLMN and, if successful, it then proceeds to originate the IMCC call and establish the modem data connection. The process then moves to block 140 where the desired data is transmitted to the call center and the call then switched to voice mode, if desired.

If the tertiary connection attempt fails, then the process goes into voice fallback in which it attempts to originate a voice-only call by setting up a voice channel cellular connection without establishing a modem data connection. This is the same process as is used for establishing a voice-only call where it was determined at block 130 that no data connection was needed. Thus, for voice-only calls, the method attempts to establish a voice channel cellular connection for communication of speech without using the primary, second, or tertiary connection attempts; whereas, for IMCC calls that are permitted voice fallback, attempted establishment of a voice channel cellular connection occurs only if primary, secondary, and tertiary connection attempts fail. In either circumstance, the process moves to block 142 where the telematics unit places a voice-only call. In the illustrated embodiment, this is done using the most recently attached PLMN which can be looked up from the list noted above that is used in the MRA connection process 134 and maintained at the vehicle. Additional attempts can be made to acquire a suitable base station if the latest registered PLMN (RPLMN) is not found. For example, acquisition of each of the PLMNs in the latest RPLMN's BCCH Allocation list (BA list) can be attempted and, if none found, then the telematics unit can go through a full acquisition process similar to that upon done by wireless GSM cellular devices upon power on. As will be understood by those skilled in the art, to place the voice-only call, the telematics unit can use Teleservice ID 11 (GSM speech teleservice for the regular telephone service) per TS23.018 Basic Call Handling using a specified voice fallback number.

Although the voice-only calls are established on the basis that a modem data connection is not needed or not available, if the call attempted at bock 142 is successful, then if desired, call center can nonetheless attempt to establish a modem data connection (e.g., by sending a suitable signaling tone the telematics unit), in which case the telematics unit can be configured to respond to this and switch to data mode for an initial vehicle data upload. Once done, the call can be switched to voice mode for communication with the vehicle occupant. Regardless of whether an initial data mode connection is attempted, after the call is successfully established, the process moves from step 142 to step 144 where the call is connected at the call center to an advisor to supply assistance to the vehicle occupant.

If the voice-only call attempt fails, then the process moves to block 146 where a check is made to determine if the particular call being placed is of the type that has a specified extended track. This can be done using the call connection table of FIG. 3. If an extended track is specified, such as for a collision or emergency call, then the process returns to retry the comprehensive connection approach 138. Thus, for more important calls, the system continues to re-attempt a connection until successful or, if desired, a maximum number of retries is attempted. If no extended track is specified, then the connection retry process 108 is considered to have failed, as indicated at block 148.

Figure 5:
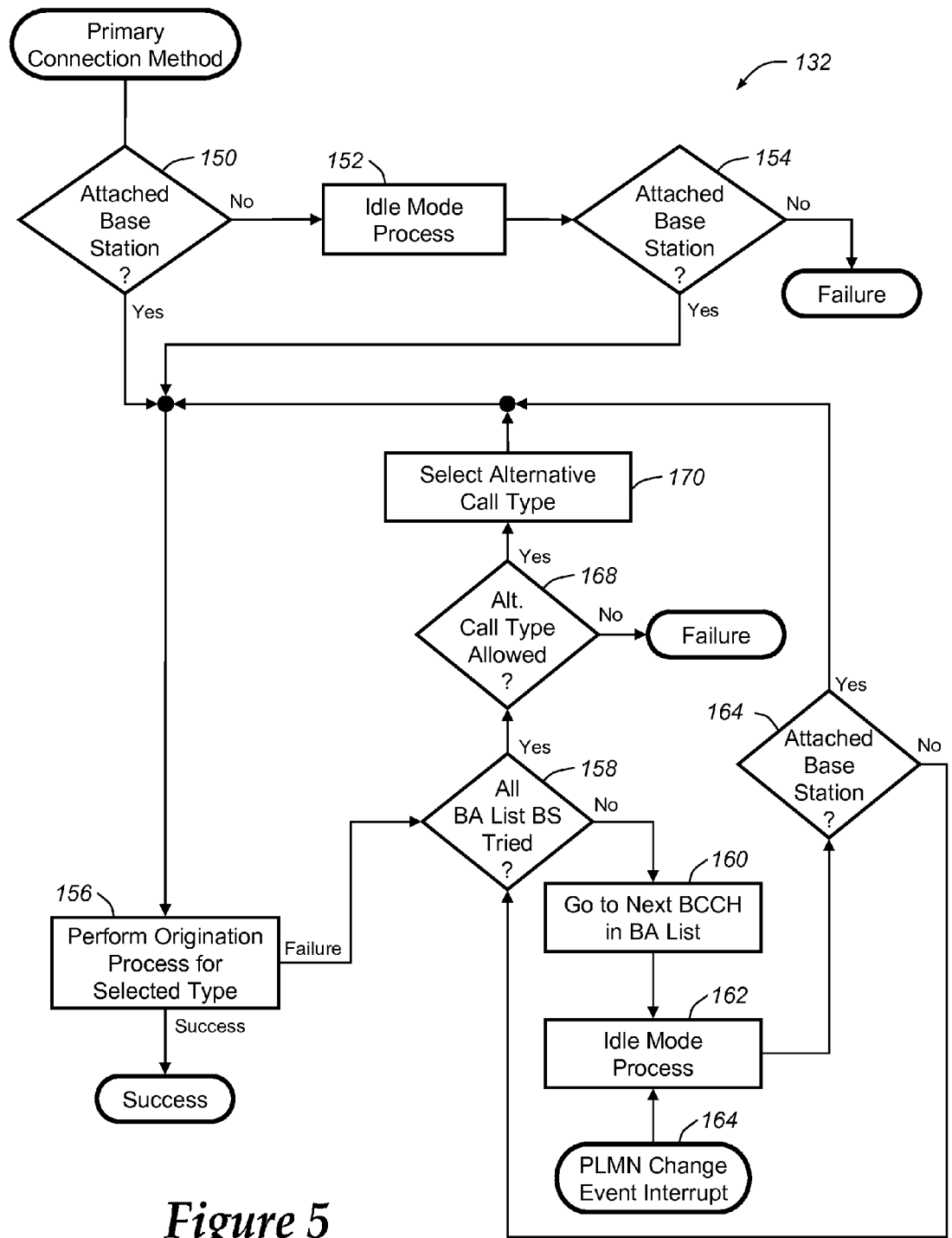
FIG. 5 is a flowchart of a primary connection attempt method used in the voice channel retry method of FIG. 4.

Turning now to FIG. 5, there is shown further details of the primary connection strategy 132 of FIG. 4. In general, the method involves verifying that the telematics unit is attached to a base station, attempting to originate a connection with the call center using the attached base station and, if that fails, then iteratively attempting to attach and connect via neighboring base stations identified by a BA list obtained from the attached base station. The method begins at step 150 where a check is made to determine if there is a currently-attached base station, such as one to which the telematics unit was already attached to prior to receiving the request to connect to the call center. If so, the process can proceed to attempt origination at step 156. If not, then the telematics unit executes an idle mode process 152 which can be the same or different than that discussed above in connection with FIG. 4. At step 154 it is determined whether the idle mode process resulted in attaching to a reselected base station. If not, then the primary connection attempt is considered a failure. As discussed above, when used as a part of the FIG. 4 data connection retry method 108, failure of this primary connection attempt is followed by a secondary connection process. Although the checks for determining if the telematics unit has successfully attached to a base station are shown in FIG. 5 and other figures as discreet steps, it will be appreciated that if, after initial determining that there is not an attached base station (e.g., no decodable BCCH) and during the process the BCCH subsequently becomes decodable, the telematics unit can continue on with the connection process.

If at block 154 it is determined that the telematics unit successfully attached to a reselected base station, then the process continues to block 156 where an origination process is carried out to establish the voice channel cellular connection via the attached base station. If successful, the method ends and the telematics unit and call center can proceed to establish a modem data connection. If the origination attempt fails, then the process moves to block 158 where an iterative process begins in which the BA list received from the attached base station is used to attempt attachment to neighboring base stations that are on the list. Thus, assuming not all base stations on the list have yet been tried, the process goes to step 160 where the next base station on the list is identified and attachment attempted using the BCCH identified for that next base station. For this purpose the telematics unit receives and decodes base station information via the BCCH and attempts to attach to a neighboring base station using the decoded information. This can be done via an idle mode process, as indicated at step 162. The idle mode process can also be used in the event a PLMN Change Event Interrupt 164 occurs anytime during the primary connection attempt process. If an interrupt 164 is received, the idle mode process can be used to carry out a PLMN reselection process and then attach to a base station following that reselection. For a reselected PLMN, the iterative process of FIG. 5 can be carried out until successful or all base stations identified from the BA list for the attached base station from the reselected PLMN have been tried.

From step 162 the process moves to step 166 where a check is made to determine if the telematics unit was able to attach to a base station. If so, then origination is attempted with that attached base station. If not, then the process loops back to step 158 to iteratively try the next base station on the BA list. Once all base stations on the active BA list have been tried, as determined at block 158, then the process can either return failed or, as shown, can check to determine at step 168 whether an alternative connection strategy exists. This can be identified from the alternative call type column of the call connection table of FIG. 3. For example, where a packet data connection is identified as a permissible alternative call type, then the process can switch to the packet data retry process 116. If none is available, then the secondary connection attempt fails; however, if an alternative connection strategy is available, then that strategy is carried out at step 170 with a call origination attempt 156 then being made.

Figure 6:
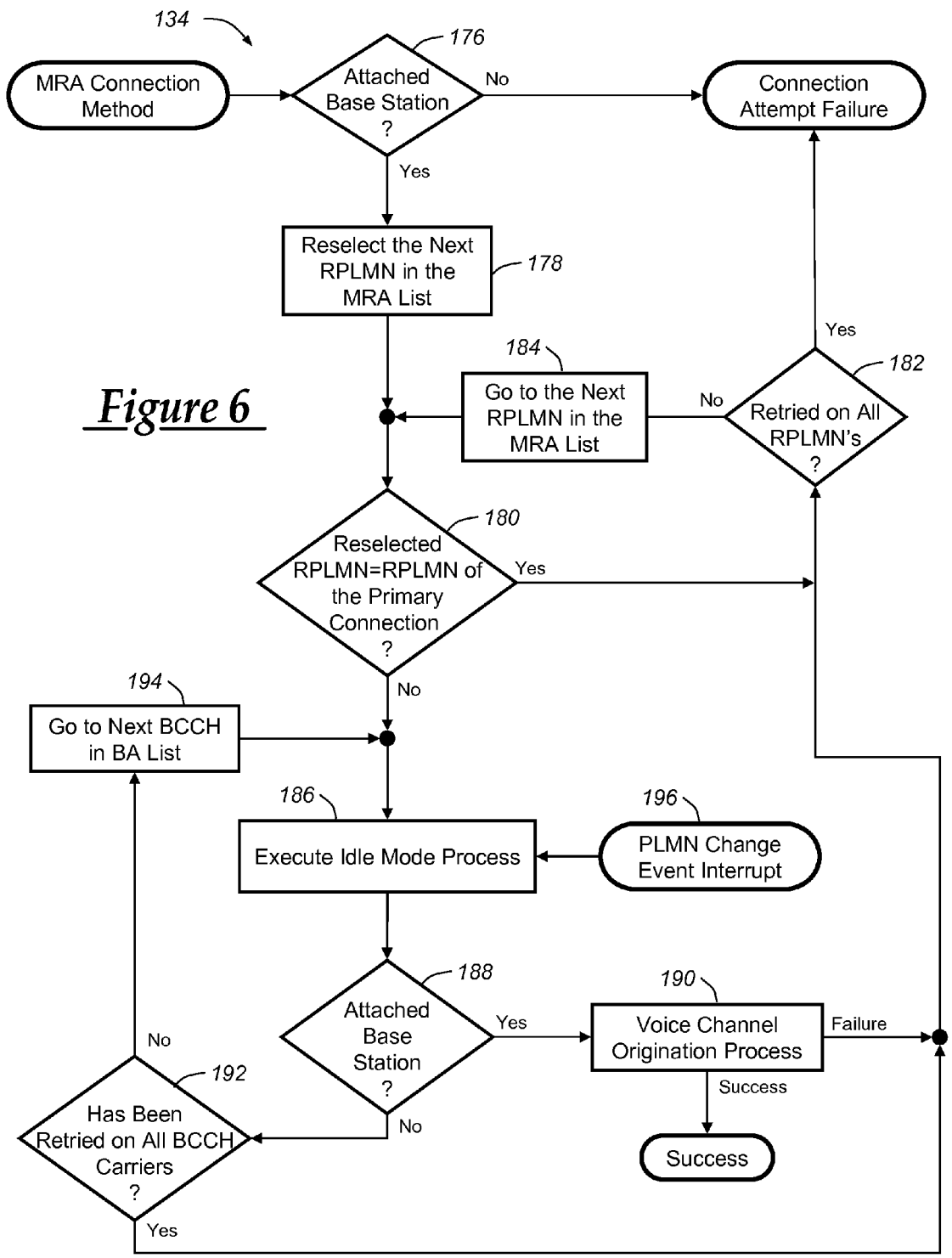
FIG. 6 is a flowchart of a secondary connection attempt method used in the retry method of FIG. 4.

FIG. 6 depicts the secondary connection method 134 which is a most recently attached (MRA) process used to attempt origination via one of the wireless carrier systems to which the telematics unit has recently successfully used. This process begins following failure of the primary connection method to successfully originate the IMCC call. In general, the MRA connection process 134 involves selecting a carrier system recently used in placing a previous call, carrying out a cell selection process using the selected carrier system, attaching to a selected base station, and originating the IMCC to the call center via the attached base station. For this purpose, a list of carrier systems is maintained at the vehicle, and this list is referred to herein as the MRA list. It includes the carrier systems that the telematics unit has previously registered with in reverse chronological order (i.e., with the most recently attached carrier system listed first). In 2G/2.5G GSM (GPRS and EDGE) and 3G W-CDMA (UMTS, HSPA) cellular systems, the wireless carrier systems are identified by PLMNs to which the cellular chipset 50 in the VTU 30 is attached by updating its location. Thus, in one embodiment, the list can be of those PLMNs for which the telematics unit has previously successfully completed an IMSI attach procedure. Given that the primary connection method has failed, the MRA connection process seeks to attach to a base station using recently registered PLMNs for which there can be assumed a reasonable likelihood of success within a particular geographic coverage area.

Initiation of the MRA connection process results when the system has detected or otherwise determined failure of the first connection attempt with the call center via an attached base station of a registered PLMN. In response to that determination, the process accesses the MRA list and carries out the iterative process described below. Typically, the telematics unit will come into the MRA connection process with an attached base station for the last PLMN used by primary connection method. This is confirmed by step 176 such that the MRA connection process will immediately terminate as failed if no such base station is attached. In other embodiments, the initially attached base station may not be required. Assuming the telematics unit is attached, the process moves to step 178 where the process accesses the MRA list of PLMNs and selects the next PLMN in the list. This can be the first entry in the MRA list or, where it is assumed that the first entry was one of the ones unsuccessfully used in the primary connection attempt, step 178 can be used to start out with the second entry in the MRA list. At step 180 a check is made to determine if the reselected PLMN is the same as that attempted during the primary connection method. If so, there is no need to attempt on that PLMN again, and the process can select the next entry in the MRA list at block 184 after first verifying at step 182 that there are still untried entries remaining in the list. The process then loops back to step 180 to again confirm that the currently-selected PLMN was not one used in the primary connection method.

Once a PLMN is selected, the process moves to step 186 where it executes an idle mode process that can be the same as those described above in connection with FIG. 4. If an attached base station is acquired, as indicated at step 188, then a voice channel origination 190 is attempted, and this can be the same as the origination process 110 identified in FIG. 2. If origination is successfully, then the telematics unit and call center can proceed to establish the modem data connection and communicate data as desired. If origination fails, then the process loops back up to block 182 to again check for more entries in the list. If the telematics unit does not attach to the selected base station resulting from step 186, then the process moves from block 188 to step 192 where a check is made to determine if all BCCH carriers (i.e., all neighboring base stations) have been tried. This can be done by obtaining the BCCH Allocation (BA) list for the base station selected in step 186, and then one by one attempting to attach to the neighboring base stations identified from the BA list. This involves scanning the BCCH carriers in the BA list received from the selected base station. Assuming there are untried nearby base stations, the process moves to step 194 where the next base station from the BA list is selected and the idle mode process is again executed for that next base station in an attempt to attach. Thus, it will be appreciated that the MRA connection process 134 involves iteratively going through the MRA list one PLMN at a time, selecting a base station for each PLMN using an idle mode process, attempting to attach to the selected base station and, if unsuccessful, attempting to attach to each of a number of neighboring base stations identified by the selected base station and, once an attached base station is acquired, attempting to originate the voice channel cellular connection via the attached base station. If origination fails on an Absolute Radio Frequency Channel Number (ARFCN) in the received BA list, the telematics unit can determine the next available ARFCN that corresponds to that PLMN entry to search for the next suitable cell. Upon failure of the origination process, the telematics unit can perform PLMN/cell reselection via the idle mode process on all BCCH ARFCNs in the received BA list of its corresponding PLMN entry in the MRA list.

As discussed above in connection with FIG. 5, the idle mode process can also be used in the event a PLMN Change Event Interrupt 196 occurs anytime during the secondary connection attempt process. If an interrupt 196 is received, the idle mode process 186 can be used to carry out a PLMN reselection process and then attach to a base station following that reselection. For a reselected PLMN, the iterative process of FIG. 6 can be carried out until successful or all base stations identified from the BA list for the attached base station from the reselected PLMN have been tried. The overall process can then either restart or continue with PLMNs from the MRA list. For example, when a PLMN Change Event 196 occurs during the MRA connection process 134, and the telematics unit is unable to camp on a new PLMN and its associated BA list, the telematics unit can check to determine if it has retried on all PLMN entries in the MRA list.

Although not shown in FIG. 6, at the successful conclusion of the MRA connection process where an origination has successfully occurred, the MRA list can be updated with the newly reselected RPLMN. As will be appreciated, the MRA list can be maintained at the vehicle by storing it in the telematics memory 54 or some other suitable location.

Figure 7:
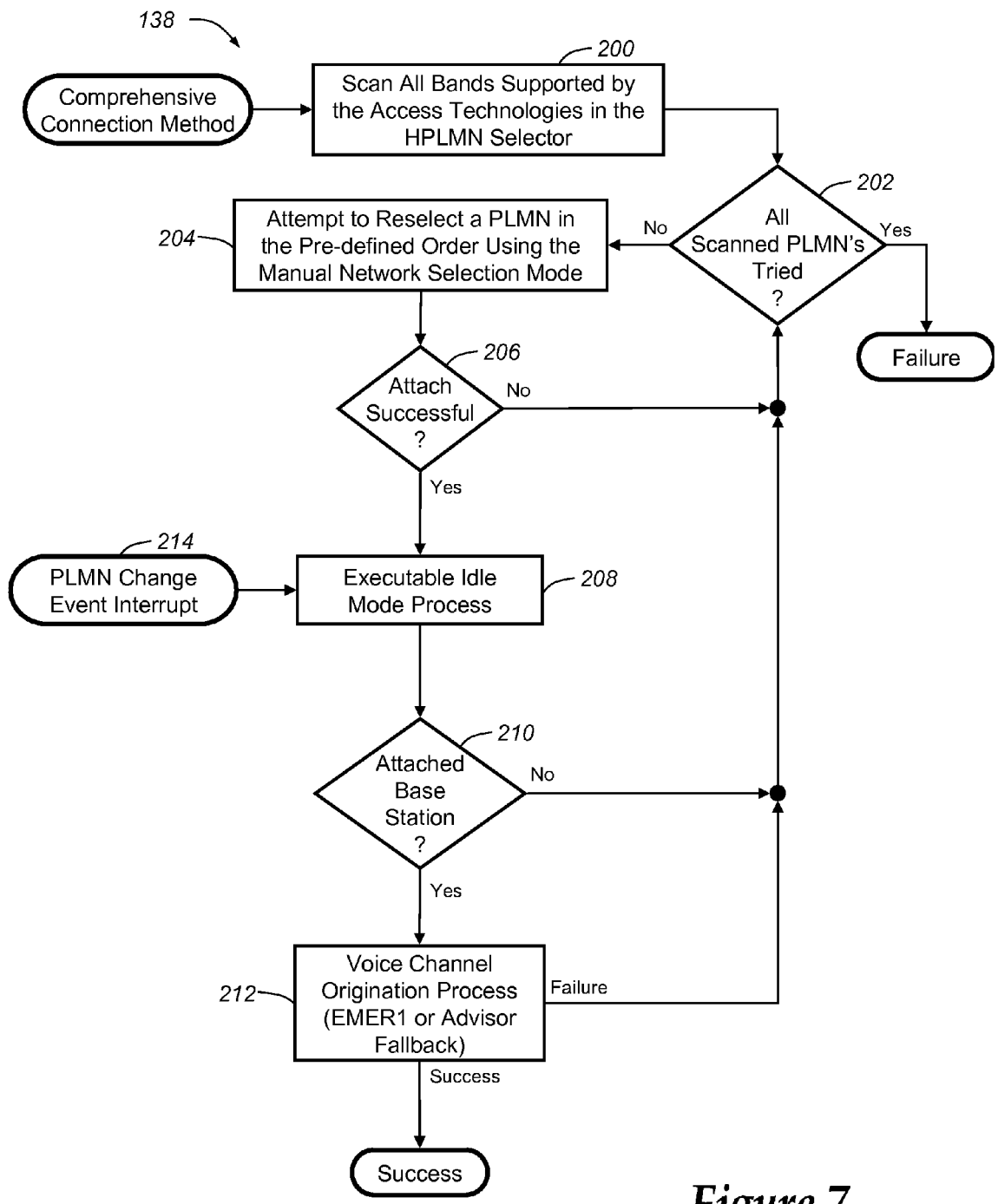
FIG. 7 is a flowchart of a tertiary connection attempt method used in the retry method of FIG. 4.

FIG. 7 shows the tertiary connection method 138 which is a comprehensive connection method utilized if the primary and secondary methods fail and the call type is one for which voice fallback is permitted. In general, the method involves using a supported manual network selection mode to attempt origination over any available wireless carrier system, and preferably this is done using a pre-established order of priority of carrier systems so that, for example, PLMNs most likely to be successfully attached to are attempted first. The method starts at step 200 where the telematics unit scans all band supported by the access technologies in the home PLMN (HPLMN) selector. As will be appreciated by those skilled in the art, for a GSM telematics unit, the SIM card contains a HPLMN selector that identifies the access technologies available for use by the telematics unit. This includes all of the GSM bands for the full ARFCN scanning. Once all available PLMNs have been found, the process moves through a loop control block 202 to step 204 where it attempts to reselect a PLMN according to a predefined order using the manual network selection mode supported by the GSM specification used by the PLMNs. In one embodiment, the order can be as follows:

1) the latest PLMN in the MRA list;
2) the HPLMN (home PLMN associated with the telematics unit);
3) a PLMN on the user controlled or operator controlled selector list (EFPLMNwAcT/EFOPLMNwAcT) in prioritized order;
4) other PLMN not in any list; and
5) a PLMN in a forbidden PLMN list or forbidden location area identity (LAI) list if no other PLMN is found by the telematics unit.

Given a selected PLMN using the process above, the telematics unit attempts to attach or otherwise access the selected PLMN and, if not successful at block 206, loops back up to determine at step 202 if there are any remaining PLMNs to try and, if so selects the next PLMN according to the pre-established order. If the PLMN is able to be accessed, then an idle mode process is used to attempt cell selection and attachment to the selected base station, as described above. This is done at step 210. Assuming the telematics unit attaches to the selected base station, then origination of a voice channel cellular connection is attempted at step 212 and this can be maintained as a voice-only call or a modem data connection (IMCC call) can be attempted if desired. Although not shown, the tertiary connection process can include attempted attachment to neighboring base stations using a BA list if the telematics unit is unable to attach to the selected base station for the selected PLMN.

As discussed above in connection with FIGS. 5 and 6, the idle mode process can also be used in the event a PLMN Change Event Interrupt 214 occurs anytime during the tertiary connection attempt process. If an interrupt 214 is received, the idle mode process 208 can be used to carry out a PLMN reselection process and then attach to a base station following that reselection. For a reselected PLMN, the iterative process of FIG. 7 can be carried out until successful or all base stations identified from the BA list for the attached base station from the reselected PLMN have been tried. The overall process can then either restart or continue with PLMNs identified at the start of the process.

Figure 8:
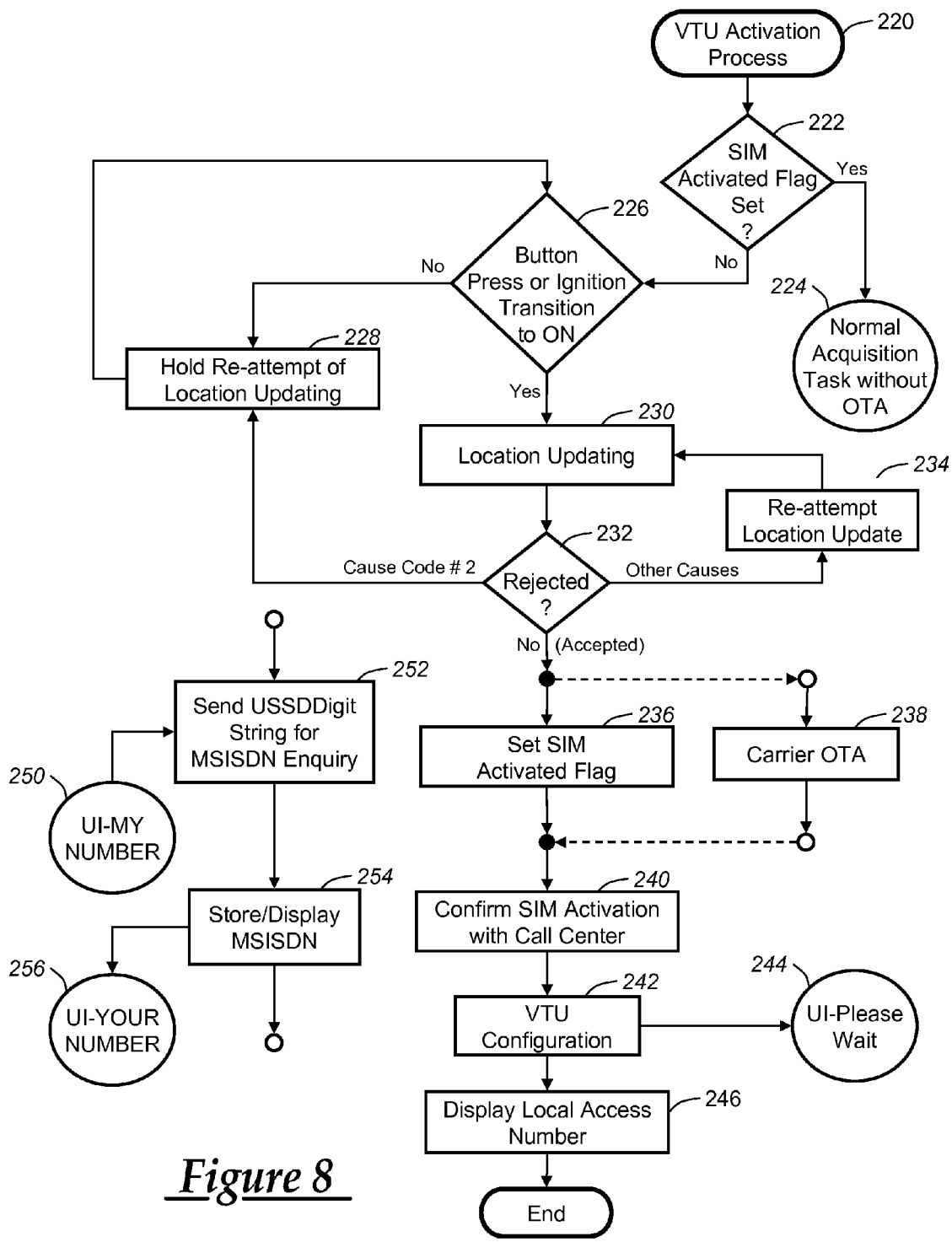
FIG. 8 is a flow chart of a vehicle telematics unit activation method that can be used to limit attempted registrations of the telematics unit on available cellular networks when the telematics unit is first installed in the vehicle.

In vehicle telematics systems that are installed as original equipment in the vehicle by its manufacturer, the country of vehicle origin (manufacturing) will often be different than the country for which the particular vehicle is destined. This can create difficulties when first initializing and/or testing an installed VTU since upon power up it may attempt to connect to an available wireless system on which it is not authorized or intended to be connected. The process of FIG. 8 depicts a method for initial cellular activation and configuration of the VTU that automatically accounts for this scenario. The process of FIG. 8 can be used for handling connection requests (e.g., from an occupant via microphone 32 or button 34, or automatically from the VTU itself or another vehicle system module) both when the VTU is first installed in the vehicle and when the vehicle is ultimately delivered to its first owner or owner's customer. This applies to connection requests for purposes of attaching/registering to a cellular network as well as call requests for voice or data calls to the call center or elsewhere. A primary function of this FIG. 8 process is to control the location updating procedure carried out by the VTU, especially during the pre-activation period and for the initial post-activation process.

The process begins at step 220 wherein the VTU is either in the On (active) mode or at least in a standby mode that permits either periodic wakeups or interrupts to the standby mode so that the VTU can carry out the activation process of FIG. 8. First, a check is made at step 222 to determine if a SIM Activated flag is set. This flag is initially cleared (set to False) and is used to indicate whether or not the IMSI profile for the VTU has been activated in the home location register (HLR). If this has already been carried out, then the VTU activation method of FIG. 8 can be largely bypassed and the process moves directly to the acquisition task procedure 224 of FIG. 9 to acquire a PLMN and base station for cellular communication without any over-the-air (OTA) programming being required (as this set SIM Activated flag indicates that this has previously been done). This will be the normal case after the vehicle has been delivered to its first customer or otherwise put into service. However, before this time, such as during the final stages of vehicle manufacturing and testing/auditing or while being kept in stock at a vehicle dealership, the initial IMSI provisioning will not have yet occurred and so the SIM Activated flag will not yet be set. Thus, the process moves to step 226 where it awaits an initiating input such as a button 34 press or an ignition trigger, this latter event indicating a transition of the ignition to the on state (and thus a wakeup of the VTU if not already in the active state). If there is no initiating input, the process holds in this state without attempting (or re-attempting) a location update for the VTU. This is indicated at block 228. The process can stay in this state between steps 226 and 228 indefinitely until there is a proper initiating input detecting at step 226, at which point the process moves to step 230 to carry out a location update.

The steps 222 and 226 need not be carried out in the order shown, as can be true for many of the steps of the various figures. Rather, the process can begin in response to a connection request via some initiating input by the user or automatically by the VTU or other onboard system, with the SIM Activated flag only then being checked to determine whether to move to the normal acquisition task process of FIG. 9 or to carry on with the location update process 230. In this regard, while the SIM card is used in GSM systems, it will be appreciated by those skilled in the art that for non-GSM systems that do not utilized a SIM, the check at step 222 can be for any flag or indicator of whether provisioning or VTU OTA programming has occurred.

The location updating procedure 230 can be carried out per the GSM Idle Mode Process which is discussed above. This process is known to those skilled in the art. Thereafter, the result of the location updating is checked at step 232 to determine how next to proceed. Where the location update is rejected and a cause code #2 is specified (meaning that the IMSI is unknown in the HLR), then the process moves back to step 228 to hold (wait) without re-attempting the location updating until another (subsequent) initiating input is received. For a rejection involving any other causes, the process moves to step 234 to re-attempt the location updating per TS 24.008 Section 4.4MM specific procedures. The advantage of this approach is that allows the VTU to repeatedly attempt to carry out a successful location updating except where it fails because the IMSI profile has not been activated in the HLR. This latter situation exists when the VTU is operational, but has not yet been provisioned and is not yet intended to be put into service; for example, while the vehicle is still at the manufacturer or dealership. In such a case, the VTU will attempt location updating only once each time the button 34 is pressed or there is some other initiating input to request cellular access. Also, rather than moving to step 228, the process could instead terminate for a cause code #2 and await a subsequent initiating input to begin the VTU activation process again.

Where the location update procedure is successful, the process moves to step 236 to set the SIM Activated flag so that on subsequent iterations the process will just move directly to the acquisition task process 224. The VTU can also at this point proceed with a standard carrier OTA programming 238 per GSM carrier requirements. This can be done as a part of the FIG. 8 method or can be carried out as a separate process thread. The cellular network may or may not push the assigned MSISDN to the SIM upon activating the SIM or completing the carrier OTA. The assigned MSISDN may be sent either through the OTA process or as a separate SMS when the SIM is successfully authenticated and activated. Successful location updating and SIM activation (and thus, VTU activation on the network) is confirmed with the call center at step 240 and this can be done by connecting to the call center at a pre-stored number and then supplying it with an SIM activation notification which can be a code or other message. If this notification fails (e.g., due to a network connection problem), the VTU can be configured to repeat this notification attempt one or more times. During this same call or via a subsequent one, the call center can download configuration information to the VTU to set up various services that may be associated with a subscriber's service plan. This is shown at step 242. The vehicle user interface can display a suitable prompt such as "Please Wait" or otherwise to indicate that this configuration is taking place, as indicated at step 244. Other prompts can be presented to the vehicle occupant during the process of FIG. 8 such as at step 232 to indicate whether the initial VTU activation is successful or not.

Either before or after full VTU configuration, the vehicle user interface can also be used to present either the MSISDN or, if one has been assigned, a Local Access Number for the VTU (step 246). This tells the vehicle occupant what number can be dialed to receive voice calls via the VTU. Presentation of the MSISDN or Local Access Number can be via text display or audible voice (speech). The Local Access Number can be one assigned by a visited PLMN that has a mobile country code (MCC) that is different than that of the home PLMN. Once the number is displayed, the process ends. As indicated at steps 250-256, the VTU can also be programmed so as to respond to a user request for the VTU callback number, such as via a voice command (e.g., "MY NUMBER") that can be inputted via microphone 32. Upon receiving this command, the VTU displays and/or reads out the Local Access Number, if one is assigned, or the MSISDN. The number to be displayed can be obtained by sending a USSD string request to the network carrier for a phone number enquiry and, upon receipt of a response, store the MSISDN/Local Access Number in the VTU and display or otherwise present it to the user.

Figure 9A:
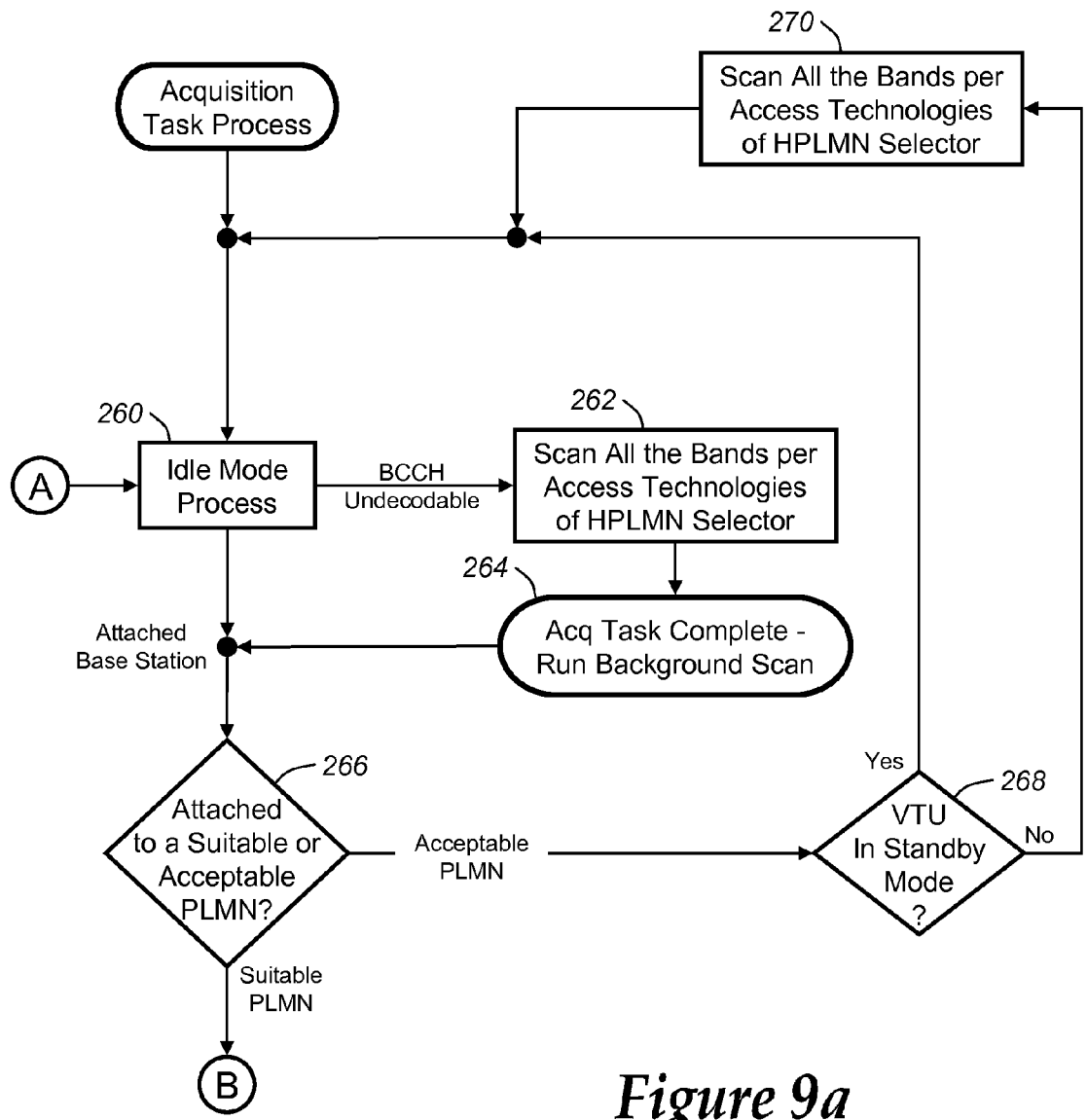
FIGS. 9A and 9B together comprise FIG. 9 which is a flowchart of an acquisition process that can be used for selecting a PLMN and base station for use by the telematics unit in communicating with the call center.
Figure 9B:
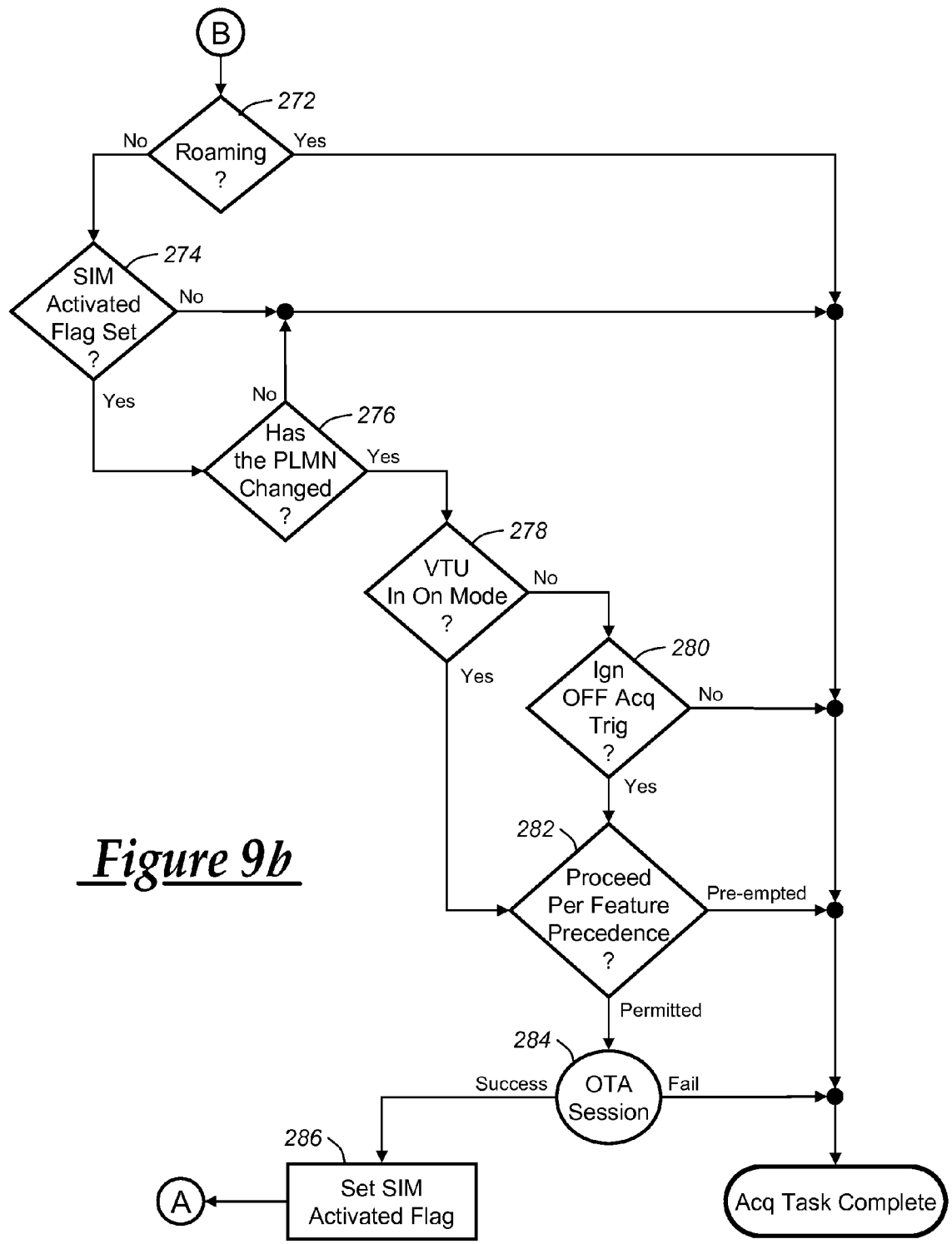

With reference to FIG. 9, there is shown an acquisition task process that is used to select a wireless cellular system (network) for use by the VTU in communicating with the call center. The process provides network selection and base station acquisition with OTA programming if needed. In the illustrated embodiment, the method operates to acquire a connection to a preferred PLMN and base station from among a number of available cellular networks. As compared to the connection attempt methods described above that are used in originating particular calls to the call center, the acquisition process of FIG. 9 is used in the disclosed embodiment to obtain a connection to a base station of a preferred network in response to an acquisition task request (e.g., a particular trigger or other initiating input or condition). For example, where the VTU includes different operational modes, such as a standby state and an active state, the acquisition task can be triggered to run upon the telematics unit waking up from the standby state and entering into the active state; or it can be triggered upon any change in operational state of the telematics unit. Other such triggers can be a PLMN change event interrupt or in response to an update of a SIM card or to either or both of the controlled selector lists (EFPLMNwAcT/EFOPLMNwAcT). Also, the acquisition method of FIG. 9 can be incorporated into the connection attempt methods described above as a part of call origination.

In general, the process of FIG. 9 involves obtaining an attached base station on a preferred network, if not already attached to one, and then activating the VTU if necessary with OTA programming from the registered network (RPLMN) on which the VTU is camped. This can be an initial activation of the VTU or simply a reprogramming with newer software. This can include providing or updating one or more controlled preferred network lists that are stored at the VTU 30, such as in its memory 54. Once attached to a base station, and prior to carrying out any OTA programming, the method checks to see if the registered PLMN is one of the preferred ones, either a home PLMN (HPLMN) or one that is listed on the user or operator controlled selector lists. If not, it performs a scan of all bands supported by the access technologies in the HPLMN selector and carries out an idle mode process to attempt to connect to one of the more preferred cellular networks. If the VTU is roaming, then no OTA programming is attempted.

The process begins at block 260 where an idle mode process is carried out to permit cell reselection and, if necessary or appropriate, PLMN reselection. This idle mode process can either be the same as that discussed above or can be any other suitable idle mode process. If this process does not result in an attached base station, then all GSM bands are scanned at step 262 per the access technologies of the HPLMN selector for the VTU. The background scanning process 264 of FIG. 11 can then be used to acquire an attached base station from the cellular networks found in the scan of step 262. Where this is done when the VTU is in a standby mode, it can be done using the idle mode process rather than the full background scan procedure of FIG. 11. Once the background scan is completed, it should result in the VTU being attached to a base station. Regardless of whether an attached base station was acquired during the idle mode process 260 or background scan 264, the process moves to step 266 where a determination is made as to whether the current (registered) PLMN is a suitable PLMN or an acceptable PLMN. A suitable PLMN is one that is listed on a preferred network list stored at the VTU; for example, in the user or operator controlled selector lists or in the MRA list. An acceptable PLMN is one that is not a suitable PLMN, including those on a forbidden PLMN list or a forbidden LAI list. Use of cellular networks on these forbidden lists may be desirable in limited circumstances, such to make emergency calls using the comprehensive connection method described above. Generally, however, it is desirable not to use a forbidden network, but to attempt PLMN reselection to find a more preferred cellular network. Thus, the process moves to step 268 to determine if the VTU is in a standby state. If not, the process moves to step 270 to scan all bands supported by the access technologies contained in the HPLMN selector. Then the idle mode process 260 is carried out using the available bands. If the VTU is in a standby state, then the process returns to carry out the idle mode process 260 without undergoing the more comprehensive band scanning process. Thus, the PLMN reselection process at this point is based on the operational state of the VTU.

Figure 10:
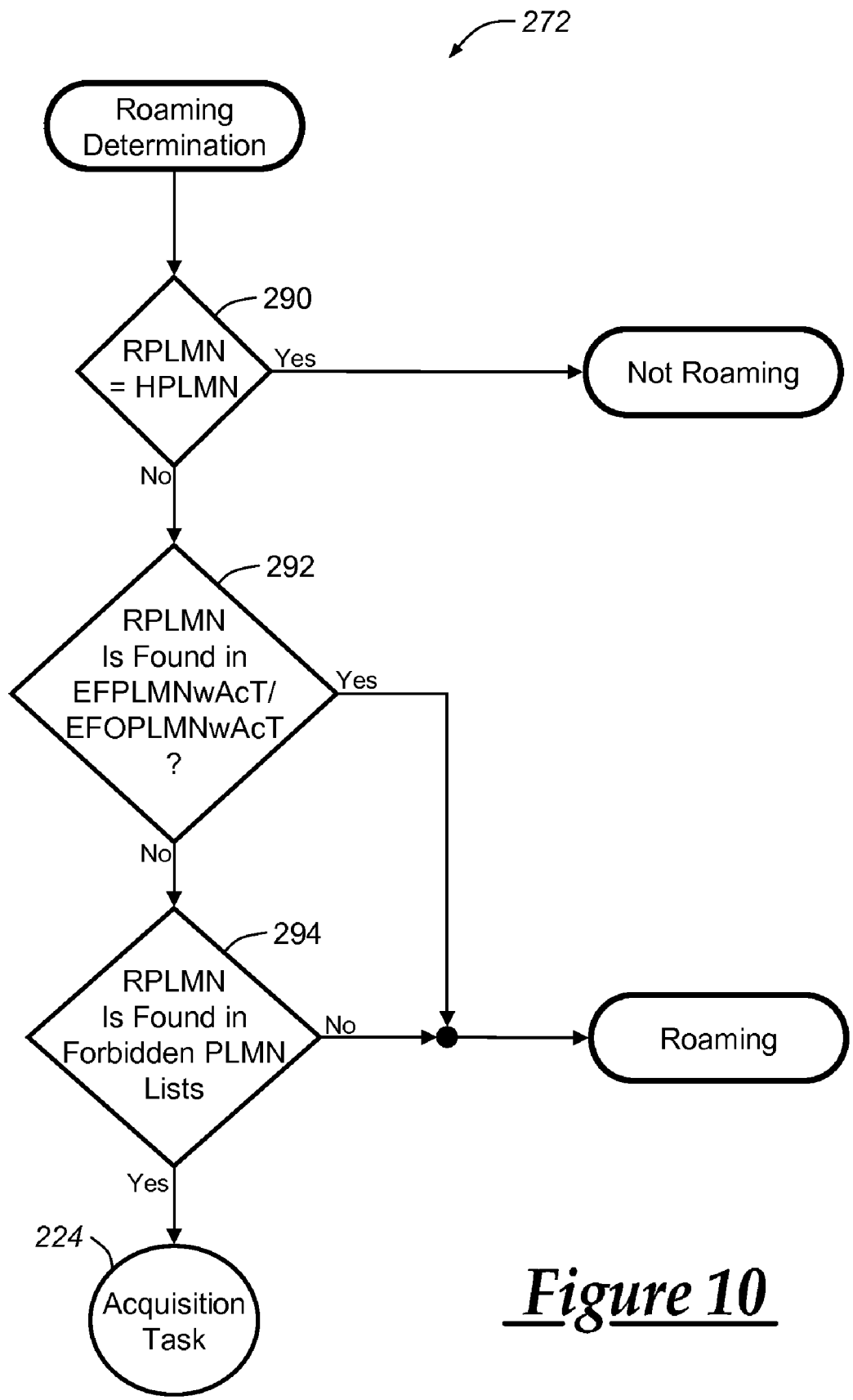
FIG. 10 is a flowchart of a roaming determination method such as can be used by the process of FIG. 9.

Assuming back at step 266 that the VTU is registered with a preferred, or suitable, PLMN (i.e., a PLMN that is on one of the preferred network lists), then the process next checks to determine whether OTA programming is needed. To do this, the process moves to step 272 to determine whether the VTU is roaming. If so, then no OTA programming is attempted and the process ends. With reference to FIG. 10, a process for making this roaming determination 272 is shown. First, a check is made at step 290 to determine if the registered (current) PLMN is the home PLMN. If so, then the VTU is not roaming. If the VTU is not camped on the home PLMN, then the process moves to step 292 to determine if the registered PLMN is found in any of the preferred network lists. As shown at step 292 the user controlled selector list EFPLMNwAcT and operator controlled selector list EFOPLMNwAcT are checked for the RPLMN. The MRA list could also be checked as well. If the RPLMN is on one of these lists, then the VTU is roaming. If not, then a check is made at step 294 to determine whether the RPLMN is found on the forbidden lists, which can include the forbidden PLMN list and forbidden LAI list. If not one these forbidden then the VTU is considered to be roaming even though it is not on a preferred non-home network. However, if the RPLMN is on one of the forbidden list, then the acquisition task is repeated in an attempt to acquire a more preferred, or at least a non-forbidden, cellular network.

Returning back to FIG. 9, if the VTU is not roaming (i.e., if it is on the home PLMN), then the process moves to step 274 to determine whether the SIM Activated flag is set. This can be the same flag as used above in connection with the method of FIG. 8, and is checked to determine whether or not the VTU has been activated (i.e., whether or not OTA programming is needed on a home network on which IMSI provisioning has occurred). If set (e.g., to True), this means that the VTU has already been activated and so the acquisition process ends. If the SIM Activated flag is not set (i.e., cleared or "False"), then at step 276 a check is made to determine if the PLMN has changed since the acquisition process begun; that is, has the current (reselected) PLMN changed from the most recently used one. If not, then the process ends without attempting OTA programming. If the cellular network has changed (i.e., the VTU has changed from a non-home PLMN to the home PLMN), then the process moves to step 278 to determine whether the VTU is in the active state or some other operational mode (e.g., a standby state). If not in the active state, then the process moves to block 280 to see whether the acquisition task request that initiated the acquisition process is an ignition off trigger, such as would be used when switching from an active state to a standby state, or when switching between different standby states. If it is not such a trigger, then the process ends without programming. However, if it is an ignition off trigger, then OTA programming is permitted while in the standby mode. Thus, if either in the active state, or in a standby state for which programming is permitted, the process moves to block 282 which is an optional feature precedence process that permits the VTU to determine priority between potentially conflicting requests. This can be used to ensure that more critical communications have priority both in terms of their call precedence and resource allocation.

Assuming that there is no other pending tasks that might take priority, the process moves to step 284 to carry out an OTA programming session. As will be known by those skilled in the art, this can include obtaining one or more new controlled selector lists. If this programming session is not successful, then the process ends, but if successful, then at step 286 the SIM Activated flag is set to indicate that the VTU has now been fully provisioned and programmed on the home network. The process then returns to step 260 carry out the idle mode process and repeat the other steps using the new programming (including the new/updated preferred network lists).

Figure 11:
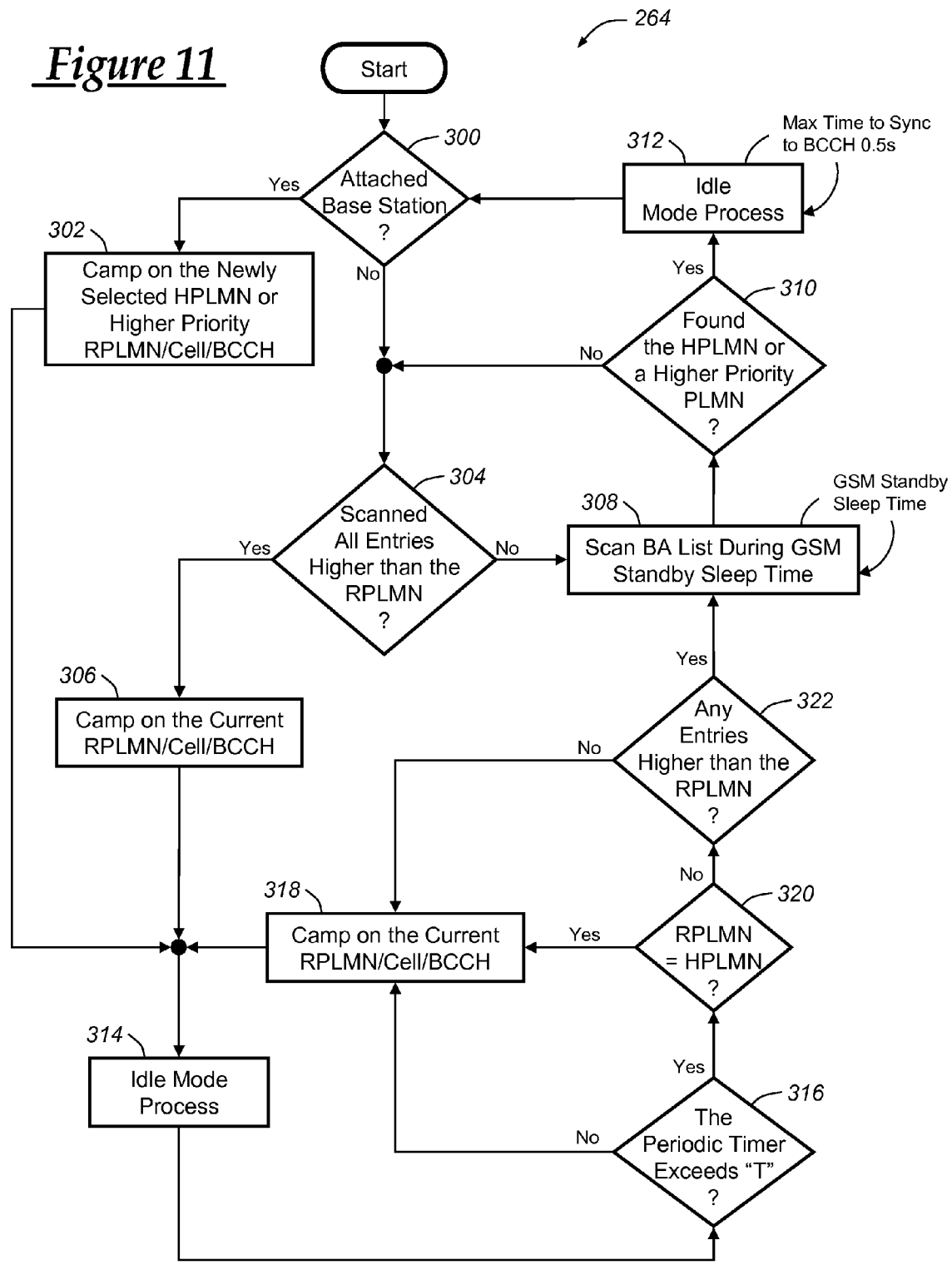
FIG. 11 is a flowchart of a background scanning process that periodically scans for availability of a more preferred PLMN than the currently registered one.

Turning now to FIG. 11, there is shown a background scanning process 264 such as is used in the acquisition process of FIG. 9. The background scan 264 is used as a process running on the VTU in the background to periodically attempt to obtain a more preferred PLMN and base station connection. As with the other processes discussed above, the background scanning process can use the idle mode process described above for cell reselection. In general, the process involves periodically checking the current (registered) PLMN against one or more preferred network lists such as the user and operator controlled selector lists, as well as the MRA list described above. If the process identifies either the home PLMN or another more preferred PLMN as being available, the process will carry out PLMN reselection and attach to a base station in the more preferred, newly registered PLMN. In this way, the VTU can constantly check for and attach to the best available PLMN for that vehicle. Where the current RPLMN is either the home PLMN or the top priority PLMN for a roaming region, this background scan process can be skipped since it generally will not then result in a more preferred cellular network than that to which it is already attached. Also, although the background scanning process is generally meant to run at all times in the background, it can be interrupted under certain circumstances; for example, it can be suspended during the acquisition task process of FIG. 9 as well as during the voice channel retry process of FIGS. 4-7.

The process can start at block 300 where a check is made to determine if there is a suitable attached base station. As in the acquisition process, a suitable base station can be one listed in one of the preferred network lists, rather than a base station of a non-listed PLMN or of a forbidden PLMN, for example. If attached to a suitable base station, then the VTU maintains this connection, as indicated at step 302. If there is no attached base station or no suitable attached base station, the process moves to step 304 where a check is made to determine if the VTU has scanned for all entries (PLMNs) in the preferred network lists that are higher priority than the RPLMN. If so, then again the VTU maintains the current registered PLMN and attached base station, as indicated at step 306. If at step 304, not all higher priority entries in the preferred network lists have been scanned, then the process moves to block 308 where the BA list for one of the more preferred available networks is scanned during the VTU standby state. This can be redone for the duration of the standby state. As discussed above, the BA list is a BCCH Allocation list that the VTU receives from the more preferred network, and the BCCH of the base stations included in the BA list can then be scanned for availability. Once this process is done, a check is made at step 310 to determine whether the home PLMN or any other higher priority (more preferred) PLMN than the current one has been found. Identifying a more preferred PLMN can be done using one or more of the preferred network lists (e.g., the user or operator controlled selector lists or the MRA list; for example, all three can be used). If no more preferred network is found, the process returns to step 304 to perform another iterative loop of steps 304, 308, and 310 until either all higher priority entries have been scanned or until none is found. If found, the process moves to step 312 where the idle mode process is carried out, resulting in an attached base station on the new, more preferred PLMN, such that the process moves through step 300 to step 302. From either step 302 or 306, the process carries out the idle mode process at step 314 and then checks the process timer at step 316. This process timer is used to set the cycle time of the background scanning process, such that it cycles to check for a more preferred PLMN each time the timer expires. Preferably, the timer is set for a period greater than one minute and more preferably, has a timeout of six minutes, although this timer can be programmed in the SIM in the range of six minutes to eight hours per TS 23.122 Section 4.4.3.3.

If the timer has not expired, the process maintains the current attached base station at step 318 and returns for another idle mode process 314. This loop can continue until timer expiration. Once that occurs, the process moves to step 320 where a check is made to determine if the registered PLMN is the home PLMN. If so, again the VTU remains attached to the base station in the currently registered PLMN. But if not, the process moves to block 322 to determine if there are any PLMNs in the preferred network lists that are more preferred than the registered PLMN. If not, then again the current one is maintained. If there are higher entries, then the process returns to step 308 to attempt cellular network reselection using a more preferred network. The process then continues as described above.

Figure 12:
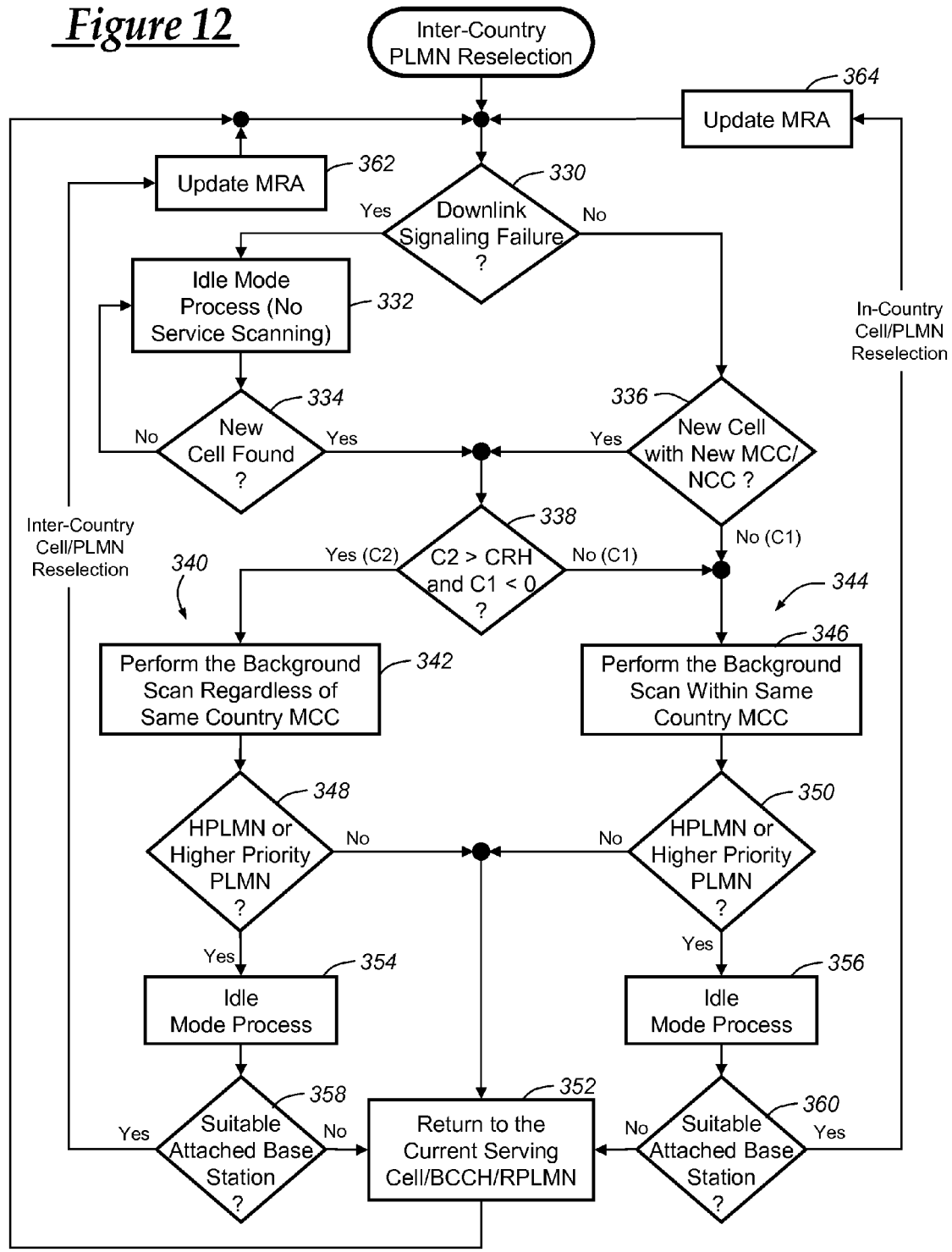
FIG. 12 is a flowchart of an inter-country PLMN reselection process that can be used for PLMN selection when systems from more than one country are available.

With reference to FIG. 12, there is shown an inter-country PLMN reselection process that determines whether cell reselection can occur using only PLMNs in the current country (i.e., that share the same mobile country code) or whether available PLMNs, regardless of country, should be used. In general, the process carries out a cellular network reselection process, maintains registration of the VTU on the current serving PLMN if no more preferred network was found, or attaches to a base station on the more preferred network if one is found. The method determines whether to carry out network reselection using only networks of the same mobile country code (MCC) as the current serving (registered) PLMN, and this can be decided based at least in part on whether there is an available base station in the current cellular network and at least in part using cell selection/reselection criteria such as the C1, C2 parameters monitored by the VTU. Thus, network and cell reselection is carried out using one of two cellular network reselection processes—a first one that attempts to find a cellular network that is more preferred than the current cellular network and that has a mobile country code that is the same as the current cellular network, and a second one that attempts to find a cellular network that is more preferred than the current cellular network regardless of the mobile country code associated with the more preferred cellular network.

The process begins at step 330 where a check is made to determine if there has been a downlink signaling failure declared for the current serving cell/PLMN (i.e., whether radio link from the base station has been lost). If so, than the idle mode process is carried out at step 332 in an attempt to locate an available base station (new cell), and this can be done without service scanning. If at step 334 no new cell is found, the idle mode process of step 332 can be carried out one or more additional times to continue searching for a new available base station. Back at step 330, if no downlink signaling failure has occurred, then the process moves to step 336 and checks to see if there is a new base station that has been found with a new (different) MCC or network color code (NCC) in the BA list. If so, or if back at step 334 a new base station is found (available), then the process moves to step 338 where cell reselection criteria are checked to determine whether reselection from the current base station is desired. In particular, if the C2 parameter exceeds the cell reselection hysteresis (CRH) and the C1 parameter is less than zero (indicating a radio link failure) then cell reselection is determined to be desired and the process therefore undertakes a cellular network reselection process 340 that is carried out regardless of MCC. For this the process moves to step 342 where a full background scan according to FIG. 11 can be carried out regardless of MCC—that is, the background scan process will look for any preferred PLMN, including those having a different MCC than the current PLMN. The C1, C2 parameters and their calculation and use are known to those skilled in the art and need not be detailed here.

If, at step 338, the reselection criteria are instead not met, then the FIG. 12 process undertakes a cellular network reselection process 344 that only looks for PLMNs having the same MCC as the current PLMN. This is also done in the event that at step 336 there was no new cell found having a MCC or NCC in the BA list that is different than the current one. To carry out this same MCC reselection process 344, the method moves to step 346 where the background scan of FIG. 11 is carried out only for PLMNs having the same MCC as the current PLMN. The remainder of the two cellular network reselection processes 340, 344 are the same; namely, after the background scan 342, 346, a check is made at respective steps 348, 350 to determine if a higher priority (more preferred) PLMN has been found. This determination can be carried out as described above using preferred network lists such as the user and operator controlled selector lists and/or the MRA list of recently attached cellular networks. If no more preferred PLMN is found, then the VTU returns to the current serving base station of the registered PLMN, as indicated at step 352 and the process thereafter ends or returns to step 330 to iteratively repeat.

If at either steps 348, 350 a more preferred PLMN is found, then the process moves to step 354, 356, respectively, to carry out the idle mode process for the more preferred PLMN. A full idle mode process can be carried out as described earlier, or one that can be restricted to cell reselection on the newly selected PLMN. Thereafter, a check is made to determine if a suitable attached base station has been acquired, steps 358, 360 and, if not, the process again moves to step 352 to continue with the current base station/RPLMN. A suitable base station can be determined in whatever manner is desired. If attached to a suitable base station at steps 358, 360, then the MRA list is updated with the newly registered PLMN, at either step 362 or 364, and the process then terminates or returns to step 330 for another iteration, as shown. As will be appreciated, in the case of the cellular network reselection process 340, a successful attached base station at step 358 means that an inter-country PLMN reselection has occurred, whereas success at step 360 means that an in-country (or intra-country) PLMN reselection has occurred.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A vehicle telematics unit activation method for use with a wireless cellular network, comprising the steps of:
    (a) receiving a connection request via an initiating input at a telematics unit in a vehicle;
    (b) attempting a location update with the wireless cellular network;
    (c) receiving a location update rejection and an identifier indicating a reason for the rejection;
    (d) re-attempting the location update if the identifier has a first value; and
    (e) waiting for a subsequent initiating input before re-attempting the location update if the identifier has a second value.

2. A vehicle telematics unit activation method as defined in claim 1, wherein step (a) further comprises determining if the telematics unit has already been activated and if so, carrying out a network acquisition process instead of steps (b) through (e).

3. A vehicle telematics unit activation method as defined in claim 2, wherein the step of determining if the telematics unit has already been activated further comprises checking an activation flag that indicates whether the wireless cellular network has provisioned the telematics unit.

4. A vehicle telematics unit activation method as defined in claim 3, wherein the method further comprises setting the activation flag if the location update is successful.

5. A vehicle telematics unit activation method as defined in claim 1, wherein step (a) further comprises receiving the initiating input as a manual input at a vehicle user interface within the vehicle.

6. A vehicle telematics unit activation method as defined in claim 1, wherein step (a) further comprises receiving the initiating input as an ignition trigger that occurs upon switching of the vehicle ignition to an on state.

7. A vehicle telematics unit activation method as defined in claim 1, wherein step (c) further comprises performing the location update on a GSM network and receiving the identifier as a cause code included in the rejection.

8. A vehicle telematics unit activation method as defined in claim 7, wherein step (e) further comprises waiting for a subsequent initiating input before re-attempting the location update if the cause code indicates that a home location register for the telematics unit does not have an IMSI profile for the telematics unit.

9. A vehicle telematics unit activation method as defined in claim 1, wherein, following a determination that the location update is successful, the method further comprises the step of contacting a call center and confirming to the call center that the telematics unit has been activated.

10. A vehicle telematics unit activation method as defined in claim 9, further comprising the step of configuring the telematics unit with information downloaded from the call center.

11. A vehicle telematics unit activation method as defined in claim 1, wherein, following a determination that the location update is successful, the method further comprises the step of obtaining a phone number assigned to the telematics unit and presenting the assigned phone number within the vehicle.

12. A vehicle telematics unit activation method for use with a GSM wireless cellular network, comprising the steps of:
 (a) receiving an initiating input and determining that the telematics unit has not been activated on the GSM network;
 (b) attempting a location update with the GSM network;
 (c) receiving a location update rejection and cause code;
 (d) re-attempting the location update only after receiving another initiating input if the cause code indicates that an IMSI for the telematics unit is not contained in a home location register for the GSM network; and otherwise
 (e) re-attempting the location update one or more times for other causes of the rejection.

13. A vehicle telematics unit activation method as defined in claim 12, wherein, following a determination that the location update is successful, the method further comprises carrying out a carrier over-the-air process and sending a confirmation to a call center that the telematics unit has been activated on the GSM network.

14. A vehicle telematics unit activation method as defined in claim 12, further comprising the step of obtaining a phone number assigned to the telematics unit and presenting the phone number in the vehicle.

15. A vehicle telematics unit activation method as defined in claim 14, wherein the phone number is an MSISDN or local access number.

* * * * *